United States Patent [19]
Chu et al.

[11] Patent Number: 6,157,942
[45] Date of Patent: Dec. 5, 2000

[54] IMPRECISE CACHING OF DIRECTORY DOWNLOAD RESPONSES FOR DYNAMIC DIRECTORY SERVICES

[75] Inventors: Lon-Chan Chu, Bellevue; Curtis D. Smith, Issaquah, both of Wash.

[73] Assignee: Microsoft Corporation, Redmond, Wash.

[21] Appl. No.: 08/910,045

[22] Filed: Aug. 13, 1997

[51] Int. Cl.$^7$ ........................... G06F 13/00
[52] U.S. Cl. ........................... 709/203
[58] Field of Search .................... 709/203, 212, 709/213, 217, 218, 219

[56] References Cited

U.S. PATENT DOCUMENTS

| | | | |
|---|---|---|---|
| 4,714,996 | 12/1987 | Gladney et al. | 707/203 |
| 5,151,989 | 9/1992 | Johnson et al. | 707/10 |
| 5,423,043 | 6/1995 | Fitzpatrick | 395/700 |
| 5,461,611 | 10/1995 | Drake, Jr. | 370/54 |
| 5,729,689 | 3/1998 | Allard et al. | 709/228 |
| 5,740,230 | 4/1998 | Vandreuil | 379/88.22 |
| 5,802,518 | 9/1998 | Karaev et al. | 707/9 |
| 5,812,996 | 9/1998 | Rubin et al. | 707/2 |
| 5,835,943 | 11/1998 | Yohe et al. | 711/118 |
| 5,860,153 | 1/1999 | Matena et al. | 711/216 |
| 5,867,665 | 2/1999 | Butman et al. | 395/200.68 |
| 5,884,024 | 3/1999 | Lim et al. | 713/201 |
| 5,896,506 | 4/1999 | Ali et al. | 709/213 |
| 5,940,594 | 8/1999 | Ali et al. | 709/203 |
| 5,944,780 | 8/1999 | Chase et al. | 709/201 |
| 5,991,810 | 11/1999 | Shapiro et al. | 709/229 |

OTHER PUBLICATIONS

"IBM Technical Disclosure Bulletin, vol. 27, NR11", *Mechanism for Secure Off–Site Computer Access*, 6754–6756, (1985).

Doyle, B., et al., "Dynamic and Interactive Web Servers". http://www.newmedia.com/NewMedia/97/03/td/Dynamic_Web_Servers,html, pp. 1–15 (Published in NewMedia Mar. 3, 1996).

Kamel, N., et al., "Intelligent Database Caching Through the Use of Page–Answers and Page–Traces", *ACM Transactions on Database Systems, vol. 17, No. 4*, pp. 601–646 (Dec. 1992).

Liu, G. Y., et al., "A Mobility–Aware Dynamic Database Caching Scheme for Wireless Mobile Computing and Communications", *International Journal On Distributed and Parallel Databases, vol. 4*, Kluwer Academic Publishers, The Netherlands, pp. 271–288 (1996).

Williams, R., "User Location Service (ULS)", Internet Draft "draft–uls–1.txt", http://rpcp.mit.edu/~itel/uls.html, pp. 1–9 (Feb. 1996).

Yeong, W., et al., "Lightweight Directory Access Protocol (LDAP V2)", *Request for Comments (RFC) 1777*, University of Michigan, ISODE Consortium, pp. 1–22 (Mar. 1995).

*Primary Examiner*—Moustafa M. Meky
*Attorney, Agent, or Firm*—Schwegman, Lundberg, Woessner & Kluth, P.A.

[57] ABSTRACT

The imprecise caching of directory download responses for dynamic directory services is disclosed. A server maintains a dynamic directory service of a plurality of clients, and an imprecise cache of directory download responses to directory download requests provided by the clients. When the server receives a new directory download request, it first searches whether an equivalent server response is stored in the imprecise cache. If there is such a response, it is returned to the client generating the request. This saves the server from having to traverse the entire dynamic directory to respond to the request. The cached responses are desirably expirable, so that accuracy of the responses is not overly sacrificed. The responses expire according to their lifetime, which is desirably adjusted based on server workload.

18 Claims, 6 Drawing Sheets

IMPRECISE CACHING OF DIRECTORY DOWNLOAD RESPONSES FOR DYNAMIC DIRECTORY SERVICES

FIELD OF THE INVENTION

This invention relates generally to dynamic directory services, and more particularly to the imprecise caching of directory download responses for such services.

BACKGROUND OF THE INVENTION

Current trends in computing suggest that computers are becoming networked to one another on a greater and greater scale. For example, computers that previously were connected to other computers in the same building over a local-area network (LAN) are now commonly connected to other computers all over the world over a wide-area network (WAN), an intranet, or the Internet. The rising prominence of the Internet in fact presages a future where all computers are able to connect with one another over a single vast global network.

With this rise in connectivity comes the need for more prompt server responses to client download requests pertaining to directory services for such networks. One type of directory is similar to a phone book. The phone book permits a person to look up the phone number of another person so that the first person can communicate with the second person. Similarly, this type of directory for a computer network permits a computer user to look up the electronic address of another computer user (for example, the user's current dynamic Internet Protocol (IP) address in the case of a typical home Internet user), so that the first user can communicate with the second user. Although directory services may be used for a wide variety of different applications other than just to locate a user by looking up his or her electronic address, such user-location applications are nevertheless very common. For example, being able to determine the current IP address of a computer user is a very important feature for such diverse Internet applications as Internet telephony, whiteboarding, and videoconferencing.

However, unlike the phone book, which is a static directory, the directory for a computer network such as the Internet frequently must be dynamic in order to be useful. The phone book is a static directory in that it is not updated very often, typically only once a year when a new book is published. The phone book remains accurate, however, because each person's phone number generally also does not change very often. Conversely, in the case of the Internet, while every user may have a static electronic mail address (that is, an e-mail address that does not change often), every user typically does not have a static IP address. Dial-up users in particular are assigned a dynamic IP address by their Internet Service Provider (ISP) each time they initiate an online session. This lessens the accuracy and usefulness of a static directory for many Internet applications.

Static directory services nevertheless do exist for the Internet, and other Internet-like networks. One such static directory service is provided by the Lightweight Directory Access Protocol (LDAP). The LDAP is known within the art, and is specifically described in W. Yeong, et al., Request for Comments (RFC) 1777, March 1995, which is hereby incorporated by reference. The LDAP permits a server to maintain a static directory. Clients capable of communicating with the server are able to add entries to the directory by sending the server the appropriate request. These entries are static in that they persist until the client establishing them requests their removal from the server. If clients forget to make such requests, the server may maintain their entries in the directory indefinitely, which in time may result in the directory including outdated information. For example, if the server is maintaining a user-location directory of IP addresses, an entry containing the dynamic IP address of a client who has since logged off the Internet is inaccurate.

Dynamic directory services differ from static directory services in that entries must be periodically refreshed by their clients, or otherwise they automatically are removed by the server. Dynamic directory services also exist for the Internet, and other Internet-like networks. One such dynamic directory service is provided by the User Location Service (ULS). The ULS is known within the art, and is specifically described in R. Williams, Internet Draft "draft-uls-1.txt", February 1996, which is hereby incorporated by reference. A server maintaining a dynamic directory as provided by the ULS is receptive to requests from clients to add entries to the directory that include a time-to-live value set by the client. If the client does not refresh its entry before the time-to-live value times out, the server is permitted to delete the entry. The time-to-live value is also known as the client refresh period. Thus, if the server is maintaining a user-location directory of IP addresses, an entry containing the dynamic IP address of a client who has since logged off will eventually be deleted by the server.

Another dynamic directory service is an extension to the LDAP as described in the U.S. patent application entitled "Server-Determined Client Refresh Periods for Dynamic Directory Services," filed on Jul. 2, 1997, Ser. No. 08/886, 796, which is hereby incorporated by reference, now U.S. Pat. No. 6,016,508. The dynamic directory service provided by this reference extends the capability of an LDAP directory to include dynamic entries. Thus, when a client sends a request to a server to create an entry for an LDAP directory maintained by the server, the client is able to specify whether the entry to be created is dynamic or static. If the entry is dynamic, the client must immediately send a refresh request to the server, in response to which the client will receive a response including a client-refresh period. If the client does not send another refresh request prior to the timing out of this period, the entry will eventually be deleted by the server.

Dynamic directories are useful in that they permit the servers maintaining them to periodically perform a garbage collection operation in a manner which does not affect the directories' accuracy. An entry in a dynamic directory is dynamic in that it lives for only a given period of time unless refreshed by its client. The server thus only deletes expired entries. By comparison, servers maintaining static directories perform garbage collections indiscriminately, because they do not know which entries have expired. The servers may delete only very old entries, which probably are outdated, but this means the entries will have persisted long enough to have rendered the directories inaccurate for a period of time. Alternatively, the servers may delete relatively younger entries, in which case the accuracy of the directory is maintained but some accurate entries will likely have been deleted.

Dynamic directories have their own flaws, however. Because the directories are dynamic, clients typically are constantly logging onto and off servers maintaining such dynamic directories. A particular client may wish to determine the identity of the other clients (i.e., their IP addresses) currently logged onto the server. The particular client may wish to do this so that it may initiate a video conference with one of the other clients, for example, or an Internet telephone call. The particular client therefore submits a directory download request to the server, the request including a particular directory filter indicating the type of clients that this particular client is interested in knowing whether they are also logged onto the server. For example, the directory filter may indicate that the particular client is interested in obtaining the IP addresses for all clients having corresponding user information reflecting that they are from the state of Washington. As another example, the directory filter may indicate that the particular client is interested in the IP addresses for all clients have corresponding user information reflecting that they have videoconferencing capability.

Processing these directory download requests, however, is typically very time consuming for the server. The server is first required to traverse the entire dynamic directory database, then filter out the information the particular client is not interested in, and finally represent the collected information in a particular protocol format for submission back to the client. For many Internet-related dynamic directory services, such as ULS and Internet Locator Service (ILS), the directory is represented by a tree data structure, which is especially time consuming for the server to traverse. This problem is compounded by the fact that in Internet-related dynamic directory services, the potential for thousands of clients or more to be logged on at any one time exists, with the potential for hundreds of clients logging onto or logging off of the server at any one moment existing as well. Thus, by the time the server traverses the dynamic directory to process a directory download request, the information may quickly become out-of-date.

Because of the time-consuming nature of the directory download requests in terms of processing them at the server, many such requests may become backed up in a queue awaiting to be serviced by the server. Eventually, the queue may become full, and the server may become unresponsive to the requests. In queuing theory, this is considered a classic mishap—that is, when the service rate of requests at the server is less than the arrival rate of new requests to the server. In addition, directory download requests may block log-on and log-off requests from other clients (although log-on and log-off requests may block directory download requests as well). Thus, as the server attempts to process the directory download requests, the entire dynamic directory maintained by the server may slow down. Clients attempting to log on and log off the server may find that it is difficult at best to do so. Clients submitting new directory download requests to the server may find that their requests are not serviced in a reasonable amount of time. The dynamic directory itself may become gridlocked, and slow to a halt, as a result of excessive directory download requests received by the server.

There is a need, therefore, to solve these problems related to directory download requests. Such a solution should permit a server to more quickly service directory download requests received from clients logged onto the server. More specifically, such a solution should permit the server to quickly service the requests so that the dynamic directory service maintained by the server does not become incapacitated as a result of such download requests.

SUMMARY OF THE INVENTION

The above-mentioned shortcomings, disadvantages and problems are addressed by the present invention, which will be understood by reading and studying the following specification. A server maintaining a dynamic directory of clients logged onto the server also maintains an imprecise cache of expirable server responses to directory download requests from the clients. When a new directory download request arrives, the server determines whether the request has a directory filter that is equivalent to a directory filter corresponding to one of the server responses in the cache that have not yet expired. If it does, the server sends back the server response having the equivalent directory filter.

This enables the server to more quickly service the directory download request. That is, the server does not have to traverse the entire dynamic directory to collect the information pertaining to the directory filter of the request; rather, information previously collected in response to an older directory download request having an equivalent directory filter is sent. The invention therefore saves the server from having to reprocess a directory download request having a directory filter equivalent to a directory filter of an older directory download request received relatively recently. This means that the server's queue will likely not become backed up, and the server will continue to be able to maintain the dynamic directory without the directory becoming gridlocked, and/or the server becoming unresponsive.

The cache is imprecise in that the server responses sent from the cache typically will not completely accurately represent the dynamic directory's current contents. For example, a client identified in a particular server response may have since logged off the server, such that when the server response is sent to answer a subsequently received download request having an equivalent directory filter, the server response will nevertheless identify this client. This imprecision in the cache, however, is minimized, because the server responses in the cache expire after a predetermined amount of time, which is desirably adjustable based on current server workload.

Thus, a given server response is inaccurate inasmuch as clients may log off and onto the server in its lifetime. Because the dynamic directory continually changes, however, this relative imprecision and inaccuracy is believed to be of little consequence. When a server is overloaded, it is desirable to increase the lifetime of the cache entries so that the server does not have to generate too many new cache entries, even though this may mean an increase in inaccuracy. Conversely, when a server is underloaded, it is desirable to decrease the lifetime of the cache entries so that the server generates new cache entries on a more frequent basis, which results in greater accuracy.

The utilization of a cache that is imprecise is believed to be a great advance in servicing download requests for dynamic directory services. The present invention describes systems, servers, methods, and computer-readable media of varying scope. In addition to the aspects and advantages of the present invention described here, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into six sections. In the first section, the hardware and the operating environment in conjunction with which embodiments of the invention may be practiced are described. In the second section, a system level overview of the invention is presented. In the third section, a method for an exemplary embodiment of the invention is provided. In the fourth section, implementation details regarding an exemplary embodiment of the invention are provided. In the fifth section, an exemplary algorithm in conjunction with which embodiments of the invention may be implemented is given. Finally, in the sixth section, a conclusion of the detailed description is described.

Hardware and Operating Environment

Figure 1:
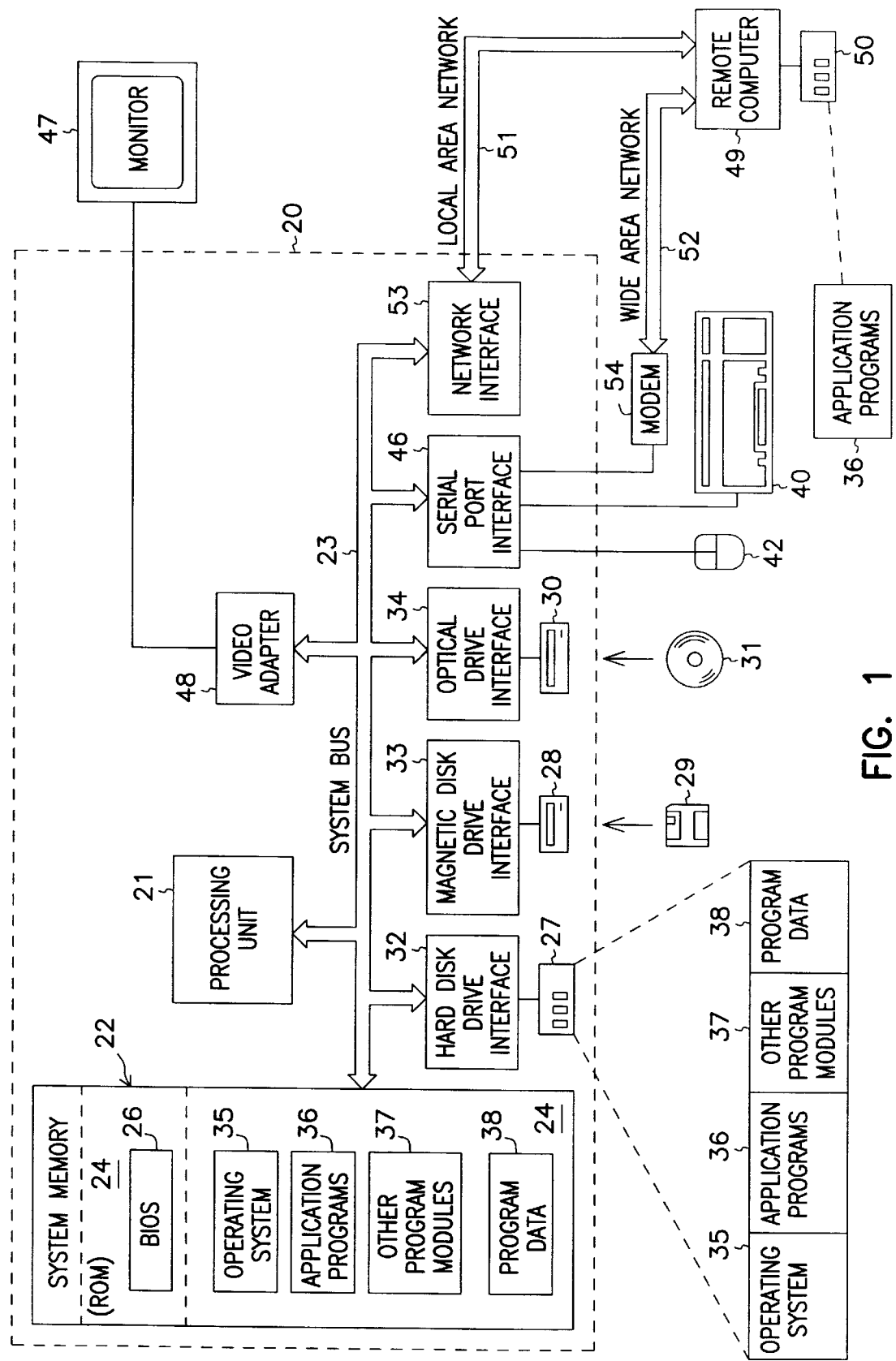
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIGS. 2(*a*)–2(*h*). The invention may be applied to any type of dynamic directory service, such as a User Location Service (ULS), or an Internet Locator Service (ILS). The ULS is known within the art, and is a service for Internet users to find other users who are online and retrieve their information. Each user has a client computer. By logging onto the server maintaining the ULS dynamic directory, a user sends his or her information to the server. The ULS server will then have an online session for this user (i.e., an entry in the dynamic directory). Another user also logged onto the server can find information regarding this user, such as the user's IP address. The ILS is also known within the art, and is like the ULS in that it is a service for Internet users to find other users who are online and retrieve their information. The ILS, however, is based on the extension to the Lightweight Directory Access Protocol (LDAP), as known within the art and described in the background section. The ILS also supports the User Location Protocol (ULP) of the ULS, also known within the art, and thus can be viewed as a superset of ULS.

Referring first to FIG. 2(*a*), server 55 and client 56 are shown. Server 55 may be communicatively coupled with client 56 over a network. Server 55 is a computer, such as the computer 20 of FIG. 1 as has been described. Server 55 has a communications device (not shown) so that it may communicate with client 56 over the network. Server 55 also has a computer-readable media, such as a memory, to store data and computer programs, and a processor to execute the programs from the media. Client 56 is also a computer, such as the computer 20 of FIG. 1, and also has a communications device (not shown) so that it may communicate with server 55 over the network. Client 56 also has a computer-readable media, such as a memory, to store data and computer programs, and a processor to execute the programs from the media. Finally, client 56 desirably has a non-volatile storage device, such as a hard disk drive.

As shown in FIG. 2(*a*), client 56 is logged onto server 55, and thus has an online session with server 55. This is represented by solid line 57. Initiation of an online session is accomplished by a client sending a message to the server requesting that the client be permitted to log onto the server. The message includes information regarding client 56, such as the client's IP address and desirably user information regarding the user at the client. For example, this user information may include the user's name, and city and state of residence. The invention is not limited to the type of information sent by the client when logging onto the server.

More specifically, in an ILS implementation, the user information includes a unique user identification for the client, such as the user's electronic mail address, and also desirably such other user information as the user's first name, last name, city and state, country, comment and IP address. Such user identification information (including the e-mail address) is known as the standard ILS attributes. An entry within a dynamic directory is composed of user identification and standard attributes including e-mail name, first name, last name, city and state, country, and IP address, as has been described. The entry may also be composed of extended attributes, such as the ability to join an audio conference, the ability to join a video conference, status of being a conference, etc. The functionality of an ILS implementation is richer than a ULS implementation. The user information in a ULS implementation generally includes a unique user identification for the client, such as the user's electronic mail address, and also desirably such other user information as the user's first name, last name, city and state, country, and IP address. The user information in a ULS implementation usually does not include extended attributes, however.

Server 55 is maintaining dynamic directory 58, which contains a number of slots, such as slot 59 which is circled in FIG. 2(*a*) for illustrative purposes only. The invention is not specific to a particular data format for the dynamic directory maintained by the server. For example, a dynamic directory service maintained as a User Location Service (ULS) or as a Internet Locator Service (ILS), as have described, may utilize the directory data formats already specified by the ULS or ILS, such as a complex tree data structure understood by those skilled in the art. For sake of clarity, however, dynamic directory 58 is diagrammatically shown in FIG. 2(*a*) as a simplified data format of a directory structure. Each slot 59 may hold an entry of the dynamic directory service (for example, corresponding to a particular client that has logged onto the server maintaining the dynamic directory service).

Specifically, as shown in FIG. 2(*a*), each slot 59 includes at least two fields, field 60, which includes a unique user identifier for a client, such as the user's e-mail address, and field 61, which includes user information regarding the client. For illustrative purposes only, field 60 is shown in FIG. 2(*a*) as representing one-letter unique user identifiers for the clients, such as A, B, C, D, E, F, etc., and field 61 is shown in FIG. 2(*a*) as representing the state in which the user of the client is located, such as Washington (Wash.), California (Calif.), Minnesota (Minn.), etc. Those of ordinary skill within the art will appreciate that the invention is not so limited; the unique user identifier in field 60 may be any sort of information, and the user information in field 61 may include other information in addition to or in lieu of the state of the client.

The slots 59 shown in FIG. 2(*a*) indicate that clients having unique client identifiers A, B, C, D, E, and F, hailing from states Washington, California, Minnesota, Washington, Washington, and Minnesota, respectively, are logged onto server 55 and are maintaining online sessions therewith. For purposes of clarity of illustration and explanation, these clients are not shown explicitly in FIG. 2(*a*). Furthermore, also for purposes of clarity of illustration and explanation, other clients may be logged onto server 55, such as client 56, but are not shown as having specific slots 59 in dynamic directory 58.

Figure 2A:
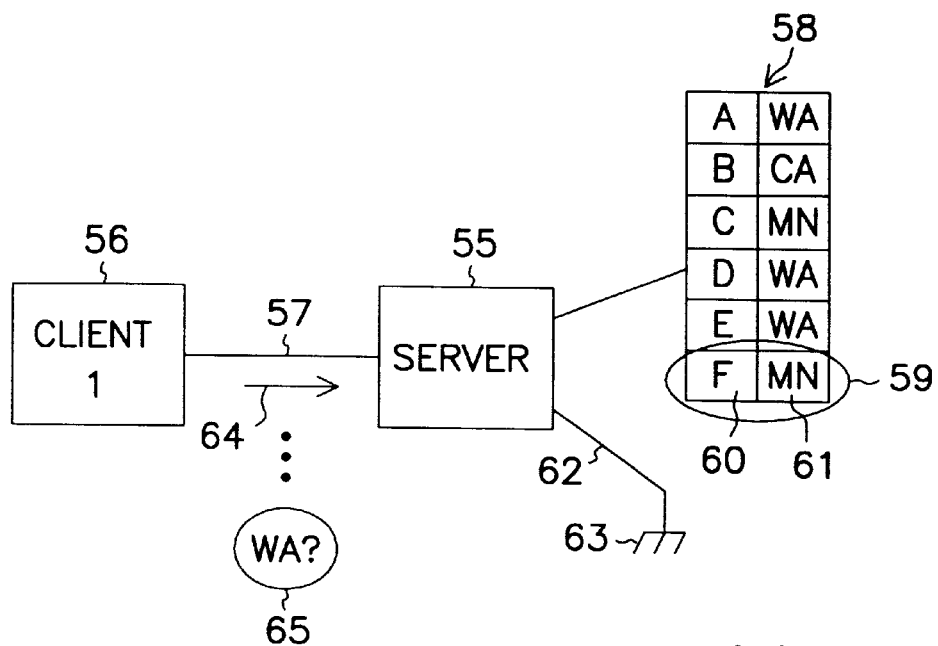
FIGS. 2(a), 2(b), 2(c), 2(d), 2(e), 2(f), 2(g), and 2(h) show diagrams illustrating a system-level overview of an exemplary embodiment of the invention; and, FIG. 3 shows a flowchart of a method to be performed by a server according to an exemplary embodiment of the invention.

Server 55 is also maintaining an imprecise cache of server responses to directory download requests previously made by the clients. The imprecise cache is represented by solid line 62. As shown in FIG. 2(a), however, the imprecise cache is empty. Thus, solid line 62 points only to null 63 (as represented by the electrical symbol for ground) to indicate that there are no server responses in the cache.

In FIG. 2(a), client 56 is submitting a directory download request to server 55, as represented by straight arrow 64. This directory download request includes a directory filter, as represented by bubble 65. Specifically, bubble 65 indicates that client 56 is interested in knowing all clients that are logged onto server 55 and have corresponding entries (slots) in dynamic directory 58 that are located in the state of Washington. Note that the invention is not so limited, and the directory download request can contain a directory filter requesting any sort of information stored within dynamic directory 58.

Figure 2B:
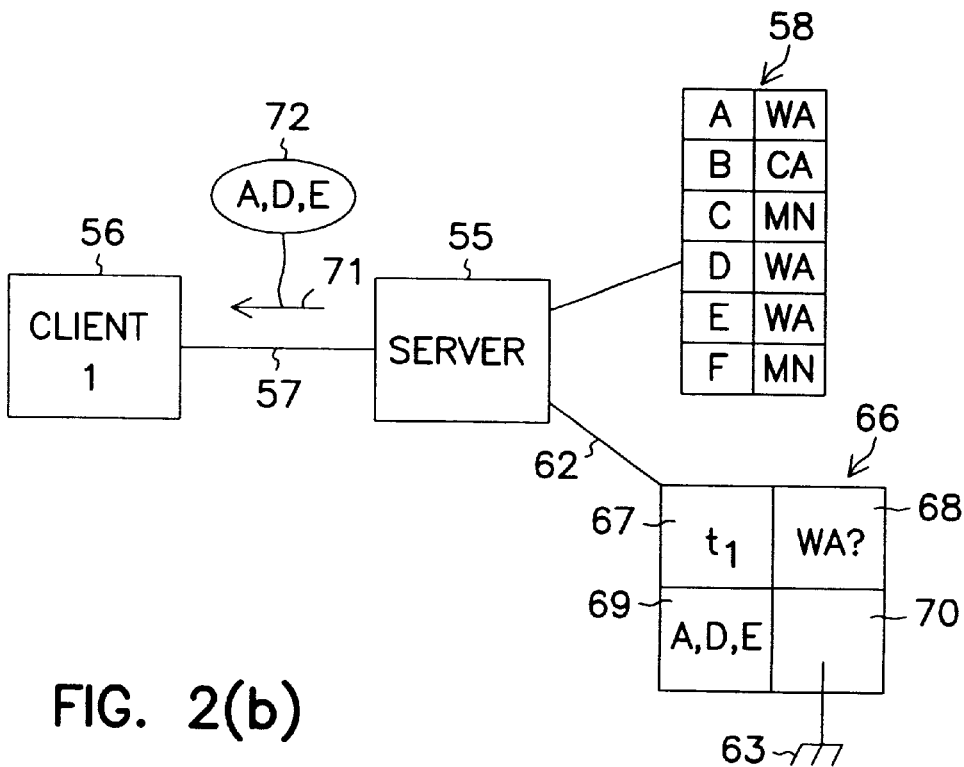

Referring next to FIG. 2(b), client 56 is still logged onto server 55, as represented by solid line 57. To respond to the directory download request from client 56, server 55 searches the imprecise cache for server responses having corresponding equivalent directory filters to the directory filter of the request. Equivalent directory filters include at least those directory filters that are identical to the directory filter of the request. The invention is not so particularly limited, however; algorithms that include similar directory filters to the directory filter are also within the scope of equivalent directory filters as this terminology is used in this patent application. In one embodiment, two different filters are equivalent if one can be rewritten into the other without changing the semantics of the other.

Because no server responses exist in the imprecise cache at the time server 55 receives the directory download request from client 56, server 55 must create new server response 66. The creation of server response 66 is a time-consuming task, because server 55 must traverse the entire directory 58 to determine the information solicited by client 56. If too many directory download requests are received by server 55, as has been explained in the background section, the server may become incapacitated, and unresponsive to messages received from the clients logged onto the server. At the very least, the server will not be able to quickly service the directory download requests submitted by the clients.

Server response 66 includes fields 67, 68, 69, and 70. Field 67 includes a time stamp indicating the time at which response 66 was created by server 55; as shown in FIG. 2(b), the time stamp in field 67 is labeled t1. Field 68 includes the directory filter corresponding to the server response; as shown in FIG. 2(b), the corresponding directory filter is for those clients having entries in directory 58 that hail from the state of Washington. The directory filter thus defines specific entries in the dynamic directory. The directory filter may include a value for at least one attribute of the entries in a dynamic directory to which the directory download request pertains.

Field 69 includes the directory response that includes the information from the entries in directory 58 at time t1 that is responsive to the directory filter; as shown in FIG. 2(b), the directory response identifies clients having unique user identifiers A, D, and E, since these are the clients in directory 58 at time t1 that are located in the state of Washington. The information may include not only user identification information, but other user information as well. The directory download response is desirably formatted according to a particular protocol format (for example, in accordance with ULS or ILS), to be sent over the network to the client. Finally, field 70 includes a pointer to the next most recent server response in the imprecise cache; as shown in FIG. 2(b), because there were no other server responses previously in the cache, field 70 includes a pointer pointing to null 63, to indicate that server response 66 is the last response in the cache.

Once server 55 has created server response 66, it returns the information in directory response 69 to answer the directory download request received from client 56. This is represented in FIG. 2(b) by solid line 71. Specifically, the response includes the information as represented by bubble 72—server 55 sends to client 56 a message indicating that clients as uniquely identified as A, D, and E all have entries within directory 58 that indicate that they are located in the state of Washington. Note that for purposes of this application, the terminology of the server sending a server response from the imprecise cache to a client that corresponds to the request encompasses the server only sending partial information within that server response (that is, one or more fields of the response), such as only directory response 69 of server response 66.

Figure 2C:
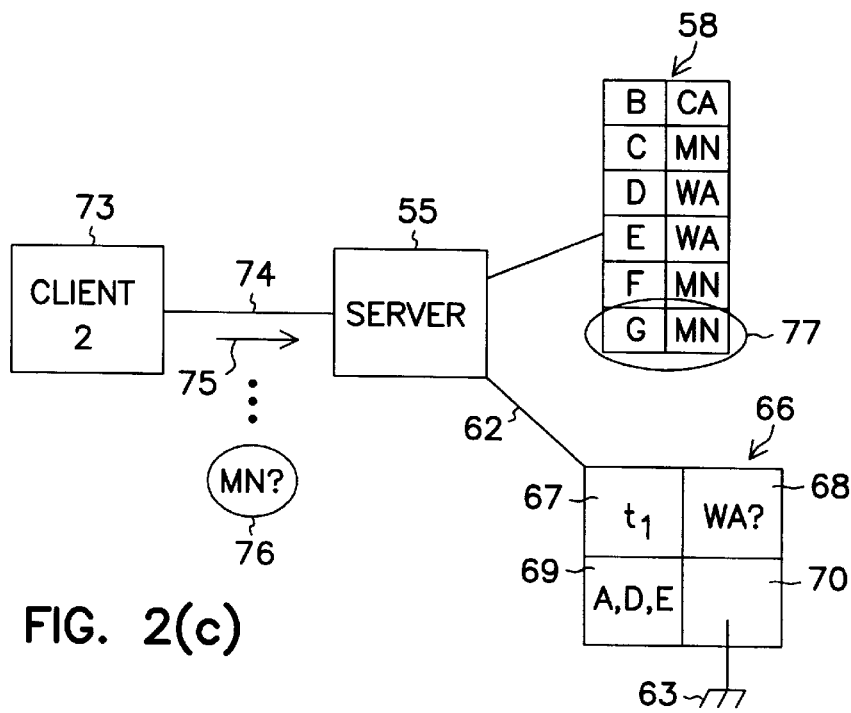

Referring next to FIG. 2(c), client 73 is shown as also logged onto server 55, as is represented by solid line 74. Client 73 is a computer, such as the computer 20 of FIG. 1, and has a communications device (not shown) so that it may communicate with server 55 over the network. Client 73 also has a computer-readable media, such as a memory, to store data and computer programs, and a processor to execute the programs from the media. Client 73 desirably has a non-volatile storage device, such as a hard disk drive.

In FIG. 2(c), client 73 is submitting a directory download request to server 55, as represented by straight arrow 75. This directory download request includes a directory filter, as represented by bubble 76. Specifically, bubble 76 indicates that client 73 is interested in knowing all clients that are logged onto server 55 and have corresponding entries (slots) in dynamic directory 58 that are located in the state of Minnesota. Note that the invention is not so limited, and the directory download request can contain a directory filter requesting any sort of information stored within dynamic directory 58.

Concurrent with client 73 submitting a directory download request to server 55, the contents of dynamic directory 58 have changed to indicate the ongoing logging on and logging off of clients to and from the server. Thus, the client as represented by the unique identifier A, located in the state of Washington, is no longer logged onto the server, and thus no longer has a corresponding entry in directory 58. Conversely, a client represented by the unique identifier G, located in the state of Minnesota, has logged onto the server, as represented by entry (slot) 77 in directory 58. Entry (slot) 77 is circled for illustrative purposes only.

Figure 2D:
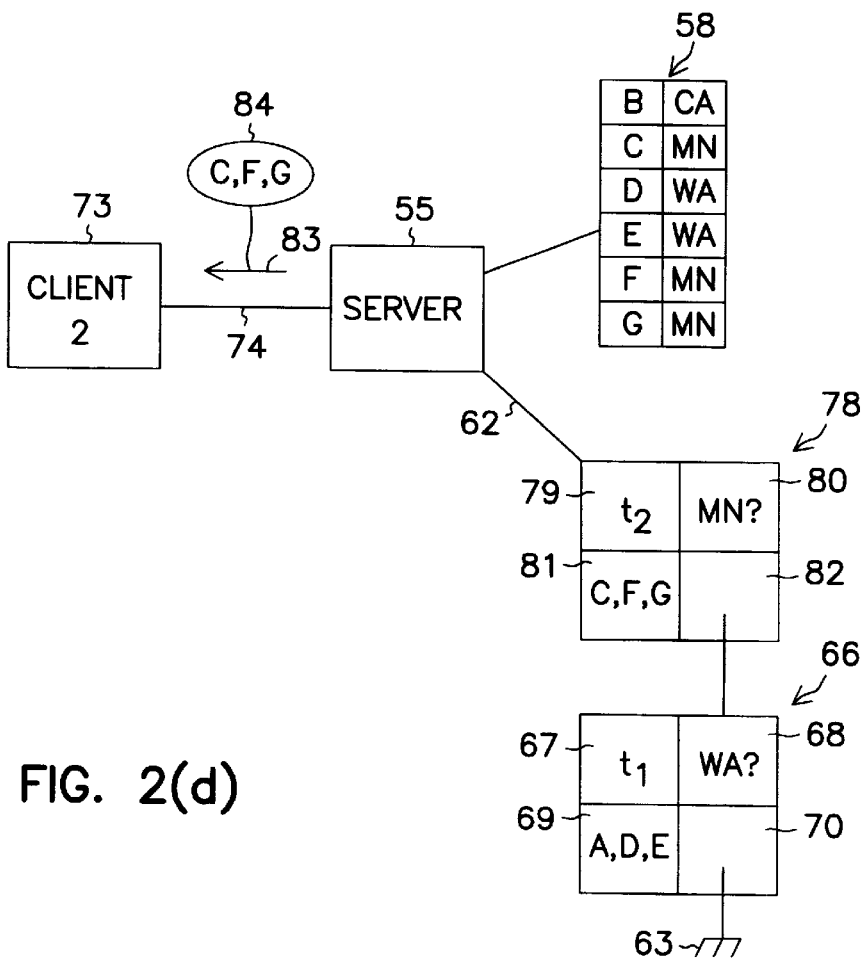

Referring next to FIG. 2(d), client 73 is still logged onto server 55, as represented by solid line 74. To respond to the directory download request from client 73, server 55 searches the imprecise cache for server responses having corresponding equivalent directory filters to the directory filter of the request. At the time server 55 receives the directory download request from client 73, however, only server response 66 is within the cache. The directory filter of server response 66, however, pertains to those clients located in the state of Washington, not those clients located in the state of Minnesota, as does the directory filter of the directory download request received from client 73.

Therefore, server 55 must create new server response 78. Server response 78 includes fields 79, 80, 81, and 82. Field 79 includes a time stamp indicating the time at which response 78 was created by server 55; as shown in FIG. 2(d), the time stamp in field 79 is labeled t2. Note that t2 is greater than t1, meaning that response 78 was created at a later time than server response 66. Field 80 includes the directory filter corresponding to the server response; as shown in FIG. 2(d), the corresponding directory filter is for those clients having entries in directory 58 that hail from the state of Minnesota.

Field 81 includes the directory response that includes the information in directory 58 at time t2 that is responsive to the directory filter; as shown in FIG. 2(d), the directory response identifies clients having unique user identifiers C, F, and G, since these are the clients in directory 58 at time t2 that are located in the state of Minnesota. Finally, field 82 includes a pointer to the next most recent server response in the imprecise cache; as shown in FIG. 2(d), field 82 includes a pointer pointing to server response 66, which itself still points to null 63.

Once server 55 has created server response 78, it returns the information in directory response 81 to answer the directory download request received from client 73. This is represented in FIG. 2(d) by solid line 83. Specifically, the response includes the information as represented by bubble 84—server 55 sends to client 73 a message indicating that clients as uniquely identified as C, F, and G all have entries within directory 58 that indicate that they are located in the state of Minnesota. Note that for purposes of this application, the terminology of the server sending a server response from the imprecise cache to a client that corresponds to the request encompasses the server only sending partial information within that server response, such as only directory response 81 of server response 78.

Figure 2E:
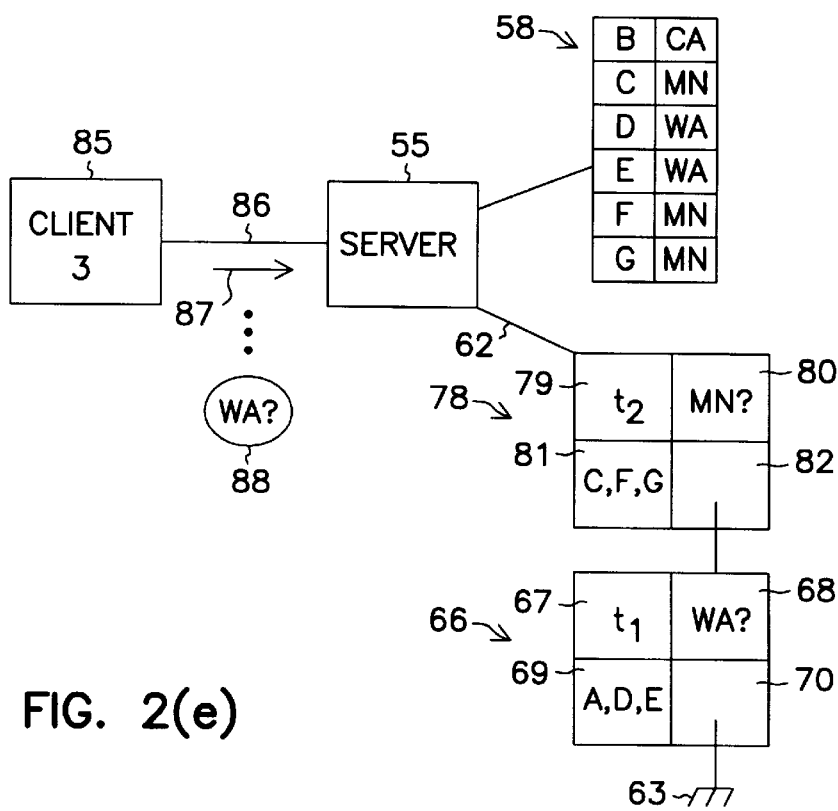

Referring next to FIG. 2(e), client 85 is shown as also logged onto server 55, as is represented by solid line 86. Client 85 is a computer, such as the computer 20 of FIG. 1, and has a communications device (not shown) so that it may communicate with server 55 over the network. Client 85 also has a computer-readable media, such as a memory, to store data and computer programs, and a processor to execute the programs from the media. Client 85 desirably has a non-volatile storage device, such as a hard disk drive.

In FIG. 2(e), client 85 is submitting a directory download request to server 55, as represented by straight arrow 87. This directory download request includes a directory filter, as represented by bubble 88. Specifically, bubble 88 indicates that client 85 is interested in knowing all clients that are logged onto server 55 and have corresponding entries (slots) in dynamic directory 58 that are located in the state of Washington. Note that the invention is not so limited, and the directory download request can contain a directory filter requesting any sort of information stored within dynamic directory 58.

Figure 2F:
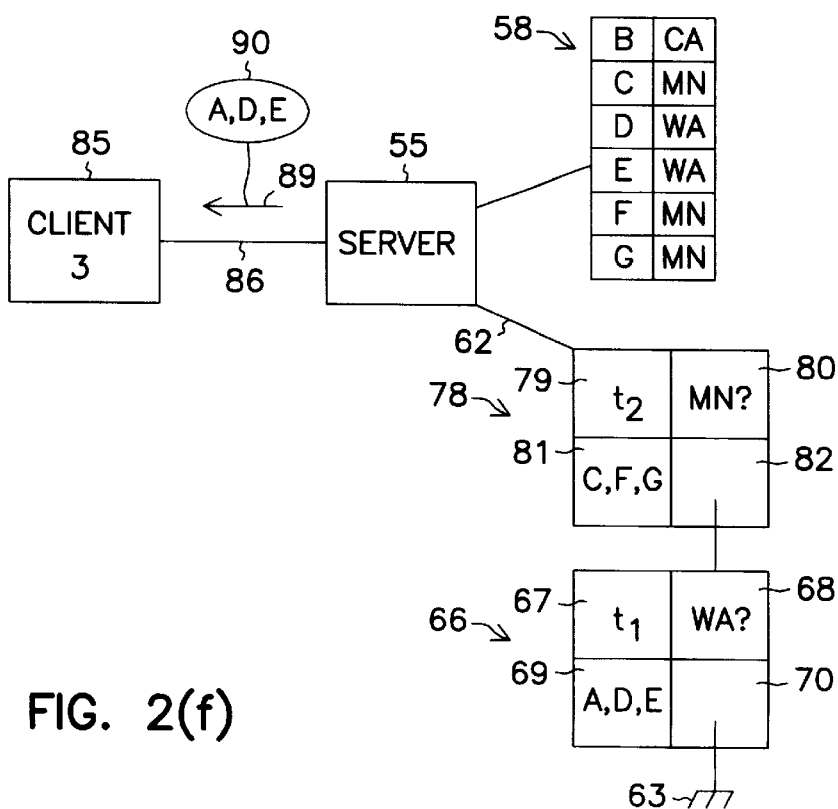

Referring next to FIG. 2(f), client 85 is still logged onto server 55, as represented by solid line 86. To respond to the directory download request from client 85, server 55 searches the imprecise cache for server responses having corresponding equivalent directory filters to the directory filter of the request. At the time server 55 receives the directory download request from client 85, server response 78 and server response 66 are within the cache. Server 55 first searches response 78, because it is first in the cache. Because its directory filter as stored in field 80 does not match, server 55 goes to the next server response, as pointed to by the pointer in field 82. Thus, server 55 searches response 66, and determines that the directory filter in field 68 matches the directory filter of the request made by client 85.

Once server 55 has found server response 66, and assuming for descriptive clarity that server response 66 has not expired, as is described in more detail below, it returns the information in directory response 69 of server response 66 to answer the directory download request received from client 85. This is represented in FIG. 2(f) by solid line 89. Specifically, the response includes the information as represented by bubble 90—server 55 sends to client 85 a message indicating that clients as uniquely identified as A, D, and E all have entries within directory 58 that indicate that they are located in the state of Washington. Note that for purposes of this application, the terminology of the server sending a server response from the imprecise cache to a client that corresponds to the request encompasses the server only sending partial information within that server response, such as only directory response 69 of server response 66.

The cache is imprecise in that the information sent to client 85 as represented by bubble 90, as duplicated from directory response 69 of server response 66, does not accurately represent the contents of dynamic directory 58. That is, bubble 90 and directory response 69 indicate that clients as uniquely identified as A, D, and E are the clients from the state of Washington that are logged on server 55 and have entries in directory 58. However, this information definitely accurately reflects the dynamic directory only when server response 66 was generated, at time t1. It inaccurately reflects the dynamic directory when the directory download request was generated, at which time directory 58 includes clients uniquely identified as D and E as hailing from the state of Washington. The information represented by bubble 90 is inaccurate in that the client as uniquely identified as A is no longer within directory 58.

However, the use of the imprecise cache is nevertheless useful and advantageous because it enables the server to more quickly service directory download requests from the clients. For example, the directory download request received from client 85 is able to be serviced by server 55 merely by returning the information in directory response 69 of server response 66. Server 55 does not have to traverse the entire directory database (i.e., directory 58), which is a time-consuming task. This means that directory download requests are more likely not to back up in a request queue, and thus that the server will not become incapacitated and unable to timely service client requests. The imprecise cache therefore enables the server to more quickly service the download requests from the clients.

The fact that the cache is imprecise—that is, that the server does not enforce cache consistency—is an innovative concept because typically caches need to be consistent with their master copy (which here is various information from directory 58). Imprecise caching is useful in the context of dynamic directories, however, because the information within dynamic directories changes so often. That the information returned by the server in response to a directory download request may be slightly inaccurate is greatly outweighed by the increased efficiency with which the server is able to service such directory download requests.

Figure 2G:
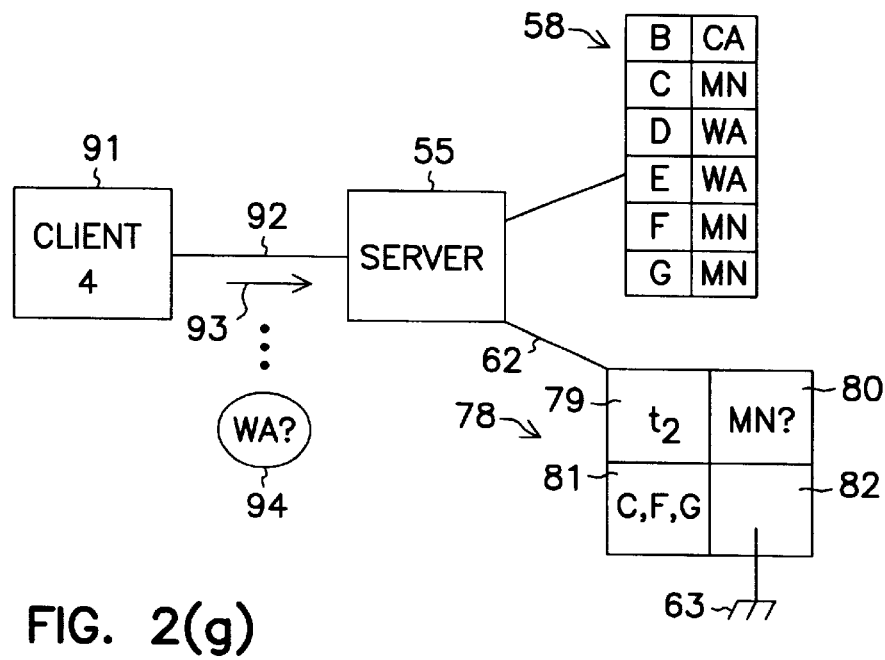

Referring now to FIG. 2(g), client 91 is shown as logged onto server 55, as is represented by solid line 92. Client 91 is a computer, such as the computer 20 of FIG. 1, and has a communications device (not shown) so that it may communicate with server 55 over the network. Client 91 also has a computer-readable media, such as a memory, to store data and computer programs, and a processor to execute the programs from the media. Client 91 desirably has a non-volatile storage device, such as a hard disk drive.

In FIG. 2(g), client 91 is submitting a directory download request to server 55, as represented by straight arrow 93. This directory download request includes a directory filter, as represented by bubble 94. Specifically, bubble 94 indicates the client 91 is interested in knowing all clients that are logged onto server 55 and having corresponding entries (slots) in dynamic directory 58 that are located in the state of Washington. Note that the invention is not so limited, and the directory download request can contain a directory filter requesting any sort of information stored within dynamic directory 58.

As shown in FIG. 2(g), the imprecise cache has changed. Specifically, server 55 has removed server response 66 from the imprecise cache, and has changed the pointer of field 82 of server response 78 to now point to null 63. Server response 66 has been deleted because it has expired; all server responses within the imprecise cache are desirably expirable. Once a response is older than a predetermined response cache lifetime, it is thus deleted by the server. This ensures that the directory responses stored in the server responses do not become too outdated. The lifetime is set based on considerations of whether accuracy of the directory download request responses is favored (in which case a shorter lifetime is set), or whether server ability to service client requests is favored (in which case a longer lifetime is set).

Alternatively, the lifetime of the server responses may be dynamically optimized such that it, as well as the number of server responses in the imprecise cache, is based on computation load on and available memory within the server. In one embodiment of the invention, the lifetime is set to five seconds, however, desirably the lifetime is adjustably set depending on the workload of the server, as can be appreciated by those of ordinary skill within the art. The setting of the lifetime is described in more detail in a following section of the detailed description.

The invention is not specifically limited to the time when server responses are deleted from the imprecise cache once they have expired. In one embodiment of the invention, they are deleted after a new directory download request has been received, and the server has either found an expired server response having an equivalent directory filter to the directory filter of the request, or has not found any server response that has an equivalent directory filter to the directory filter of the request. In other words, expired responses are deleted when a new server response must be added to the cache. Where the first response in the cache is numbered 1, and subsequent responses numbered 2, 3, 4, et seq., until the final response N is reached (the pointer of response N pointing to the null), the ages of the responses is such that age(1)<age(2)< . . . <age(N). Furthermore, where the first response is the newly added response to the cache, and where all expired responses have already been deleted, age(N)−age(2)<predetermined response lifetime. A method for this embodiment of the invention is specifically described in a following section of this detailed description.

Furthermore, the data structure for the cache as has been described in FIG. 2(a) through FIG. 2(g) thus far is amenable to quick deletion of expired server responses in the cache. Specifically, the first response in the cache, as pointed to by solid line 62 in these figures, is always the most recent response in the cache. This means that once the server finds an expired response in the cache, it knows that all subsequent responses have also expired. Thus, the server only has to repoint the pointer of the oldest non-expired response (that is, the response before the first expired response in the cache) to the null value. This removes the remaining responses from the imprecise cache. The memory dedicated to these responses is freed immediately.

Figure 2H:
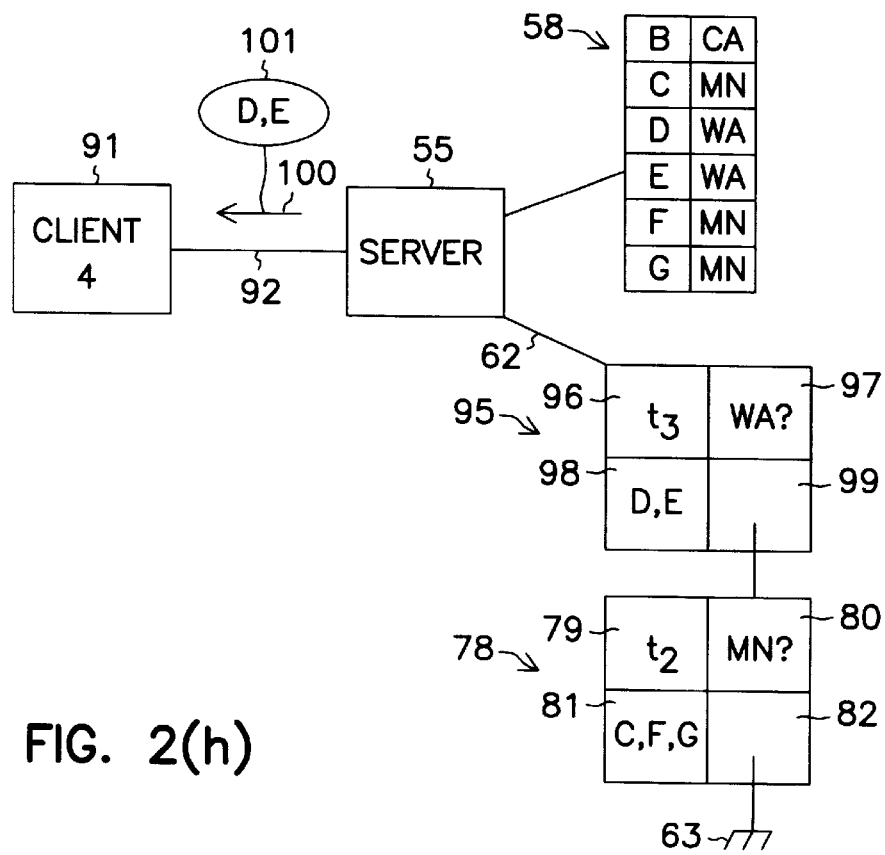

Referring now to FIG. 2(h), client 91 is still logged onto server 55, as represented by solid line 92. To respond to the directory download request from client 91, server 55 searches the imprecise cache for server responses having corresponding equivalent directory filters to the directory filter of the request. At the time server 55 receives the directory download request from client 91, however, only server response 78 is within the cache. Server response 66 has already been deleted as an expired response. Server response 78, though, pertains to those clients located in the state of Minnesota, not those clients located in the state of Washington, as does the directory filter of the directory download request received from client 91.

Therefore, server 55 must again create a new server response having a directory filter pertaining to clients located in the state of Washington. This new response is server response 95, which includes fields 96, 97, 98, and 99. Field 96 includes a time stamp indicating the time at which response 95 was created by server 55; as shown in FIG. 2(h), the time stamp in field 96 is labeled t3. Note that t3 is greater than t2, meaning that response 95 was created at a later time than serve response 78. Field 97 includes the directory filter corresponding to the server response; as shown in FIG. 2(h), the corresponding directory filter is for those clients having entries in directory 58 that are from the state of Washington. Field 98 includes the directory response that includes the information in directory 58 at time t3 that is responsive to the directory filter; as shown in FIG. 2(h), the directory response identifies clients having unique user identifiers D and E, since these are the clients in directory 58 at time t3 that are located in the state of Washington. Finally, field 99 includes a pointer to the next most recent server response in the imprecise cache; as shown in FIG. 2(h), field 99 includes a pointer pointing to server response 78, which itself still points to null 63.

Once server 55 has created server response 95, it returns the information in directory response 95 to answer the directory download request received from client 91. This is represented in FIG. 2(h) by solid line 100. Specifically, the response includes the information as represented by bubble 101—server 55 sends to client 91 a message indicating that clients as uniquely identified as D and E all have entries within directory 58 that indicate that they are located in the state of Washington. Note that for purposes of this application, the terminology of the server sending a server response from the imprecise cache to a client that corresponds to the request encompasses the server only sending partial information within that server response, such as only directory response 98 of server response 95.

A system level overview of the invention has been provided. Those of ordinary skill within the art will appreciate that a client may request that the server create more than one entry for it in the dynamic directory. Those of ordinary skill within the art will also appreciate that a client may request that the server create one or more dynamic attributes from an otherwise static entry in a directory. The terminology used in this patent application with respect to a client logging onto a server is also meant to include both of these cases.

Method of an Exemplary Embodiment of the Invention

In the previous section, a system level overview of the operation of an exemplary embodiment of the invention was described. In this section, a particular method performed by the server of such an exemplary embodiment is described by reference to a flowchart. The method to be performed by the server constitutes computer programs made up of computer-executable instructions. Describing the method by reference to a flowchart enables one skilled in the art to develop programs including instructions to carry out the methods on a suitable computerized server (the processor of the clients executing the instructions from computer-readable media).

Figure 3:
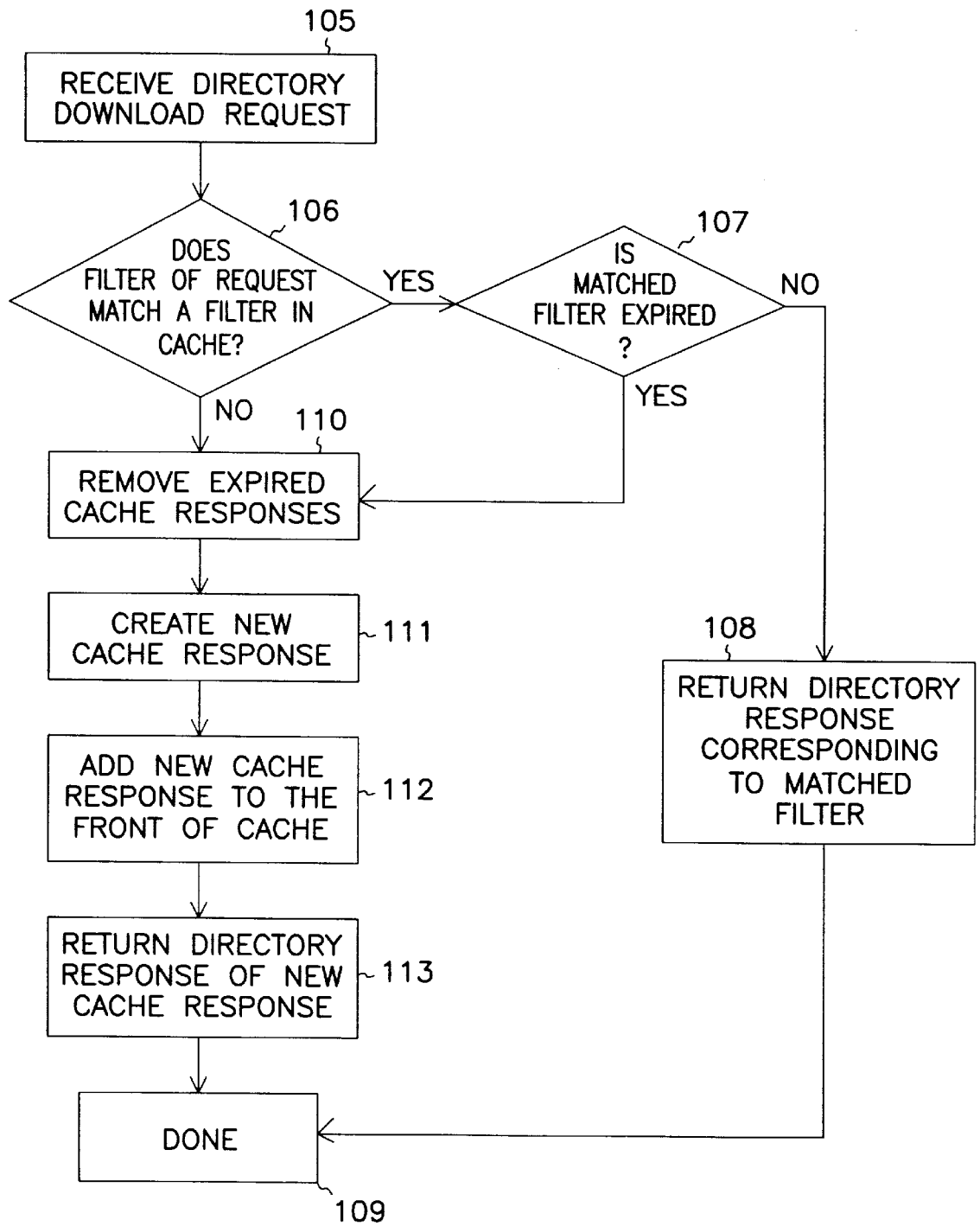

Referring to FIG. 3, a flowchart of an event-driven method to be performed by a server according to an exemplary embodiment of the invention is shown. The method is event driven in that it is not performed by the server unless and until it receives a message from the client through a communications device of the server, the message pertaining to a directory download request. In the starting point of step 105, the server receives a message including a directory download request from a client through its communication device. The directory download request includes a directory filter including a value for at least one attribute of the entries in a dynamic directory maintained by the server. That is, the directory filter specifies the type of clients that should be identified in a response to the request.

In step 106, the server determines whether the directory filter of the directory download request is equivalent to (i.e., matches) a directory filter of a server response in an imprecise cache of such server responses also maintained by the server. The imprecise cache includes a list of server responses as has been described. Each server response includes a directory filter corresponding to a previously received directory download request, a directory response corresponding to the directory filter, a time stamp corresponding to when the server response was created, and a pointer pointing to another (desirably older) server response, or to a null if it is the last server response in the list.

If the server successfully matches the directory filter of the directory download request to a directory filter of a server response in the imprecise cache, in step 107 the server determines whether the server response having the matching directory filter has expired. Each server response is desirably only permitted to live for a predetermined length of time (that is, a predetermined lifetime). In step 107, the server determines if the matched response has exceeded this predetermined length of time, by comparing the current machine time of the server with the time stamp of the server response.

If the matched server response has not expired, in step 108 the server sends to the client generating the directory download request through the communications device a message including the directory response from the matched server response. In other words, the returned directory response corresponds to the filter matched in step 106, in that both the directory response and the filter are part of the same server response. The method performed by the server then ends in step 109.

If, however, the filter of the directory download request is not equivalent to the filter of any of the server responses, as determined in step 106, or the server response having an equivalent filter is determined in step 107 to have expired, the method proceeds to step 110, where the server removes all expired cache (server) responses. In one embodiment of the invention, the imprecise cache is a list of server responses such that the first entry in the list is the most recent response, and the last entry is the oldest response. Thus, once the server has determined that a given response in the list has expired, it knows that all subsequent responses in the cache have also expired, such that it deletes all of these server responses.

In step 111, the server generates a new server (cache) response responsive to the directory download request received in step 105 from a client. This involves setting the four fields of the new server response. The server sets the time stamp field to the current machine time, which is the time at which the server response was created. The server sets the directory filter field to correspond to the directory filter of the received directory download request, since it is this latter directory filter to which the server response is responsive and to which it corresponds. The server sets the directory response field by traversing the entire dynamic directory maintained by the server, gathering the information requested in the directory field as is present in the dynamic directory. This is a computationally intensive task. Finally, the server sets the pointer field to point to the prior most recently created server response, such that the current server response is the new first response in the cache, and the old first response is now the second response in the cache. Setting the pointer is what is represented in step 112 of FIG. 3 as adding the new response to the front of the cache. In step 113 the server sends to the client generating the directory download request through the communications device a message including the directory response from the server response just created. The method performed by the server then ends in step 109.

The particular method performed by the server of an exemplary embodiment for an implementation of the invention has been described. The method is amenable to implementation on a server maintaining an ILS or a ULS, as those of ordinary skill in the art will appreciate. However, the invention is not so limited; the method may be implemented on any server maintaining any type of dynamic directory service within the scope of the invention.

Implementation Details

In this section, implementation details regarding an imprecise cache, according to an exemplary embodiment of the invention, are provided. Those of ordinary skill within the art will recognize that such details provide further information regarding imprecise caching and how they relate to an exemplary embodiment of the invention. Specifically, imprecise cache policies, imprecise cache dynamics, and imprecise cache and imprecise cache entry parameters are described in this section. A comparison of precise and imprecise caches is also given.

Those of ordinary skill within the art will further appreciate that as used in this section the term "cache entry" refers to a server (cached) response as described in the previous sections. The terminology "cache entry" is used here to focus the description on imprecise caching itself. Furthermore, the term "cache entry" does not refer to an entry in a dynamic directory. While a cache entry refers to a server response, an entry in a directory is what is created by the server when a client logs onto the server for an online session.

There are five policies that govern the implementation of an exemplary embodiment of the invention. First, a cache entry is said to be invalidated when the entry has expired; those of ordinary skill within the art will recognize that consistency is not an issue in this situation. Second, a cache entry is checked to determine whether the entry should be invalidated when there is a miss in the cache (i.e., when there is no match for a desired server response in the cache). Third, it is determined that a cache entry is to be removed from the cache when an entry is invalidated, when cache lifetime has changed (i.e., such that one or more cache entries are now expired and invalidated), or when no memory is available for a new entry, in which case a replacement rule is invoked. Fourth, once it has been determined that a cache entry is to be removed, the specific entry to remove is determined by the replacement rule, or if an entry is invalidated, then the invalidated entry is removed. Fifth, the replacement rule governing the implementation of an exemplary embodiment of the invention is that the cache entry least recently used (LRU), or the entry having the lowest hit ratio, is replaced by the new entry. The hit ratio is the ratio of the number of hits (matches) to the number of times the cache entry was examined (visited) to look for a match.

As has been described in preceding sections of the detailed description, the lifetime of the cache entries in the imprecise cache is desirably adjustable based on the workload of the server. The dynamics of cache (entry) lifetime therefore govern the implementation of an exemplary embodiment of the invention. Server workload is characterized in terms of queuing theory known within the art. Lifetime is adjusted primarily to avoid the situation where arrival rate of search requests requiring a server response is greater than the service rate at which the server processes these requests. Workload is thus characterized as the ratio of arrival rate to service rate, such that a workload less than or equal to one is desirable.

Therefore, workload and cache (entry) lifetime must be calculated and adjusted, respectively. The invention is not limited to the manner in which these processes are performed. However, in one embodiment of the invention, service rate and arrival rate are measured at a predetermined periodicity, and workload is calculated accordingly based on the measured service and arrival rates. Based on this calculation of workload, cache (entry) lifetime is adjusted. If workload is greater than one, then lifetime is increased by a predetermined cache lifetime increment value; if workload is less than or equal to one, then lifetime is decreased by a predetermined cache lifetime decrement value. The predetermined cache lifetime increment and decrement values may be equal to one another. Once cache lifetime has been adjusted, according to this embodiment of the invention, the cache lifetime is reset to a predetermined minimum cache lifetime value if the lifetime is less than the predetermined minimum cache lifetime value. Furthermore, if the lifetime is greater than a predetermined maximum cache lifetime value, it is reset to the predetermined maximum cache lifetime value.

Thus, for a lightly loaded server, cache lifetime will eventually reach the predetermined minimum cache lifetime value after transiently oscillating. Furthermore, for a heavily loaded server, cache lifetime will eventually reach the maximum cache lifetime value after transiently oscillating. In the former case, this means that server responses in the cache will have a shorter lifetime, which is sensible because the server is not so overloaded that it cannot process new server responses as needed. However, in the latter case, the server responses in the cache have a longer lifetime, which is also sensible because the server is overloaded such that it cannot process many new server responses, and therefore needs to rely on cached server responses more heavily. Once cache (entry) lifetime has changed, newly expired cache entries (if any) are removed.

In an exemplary embodiment of the invention, there are eleven cache parameters, as defined in the following table.

| Parameter | Definition |
| --- | --- |
| Cache (entry) lifetime | The length of time a server response is permitted to live in the cache |
| Maximum cache lifetime | The maximum value to which the cache lifetime can be adjusted |
| Minimum cache lifetime | The minimum value to which the cache lifetime can be adjusted |
| Cache lifetime increment | The amount of time to increase cache lifetime by, when required |
| Cache lifetime decrement | The amount of time to decrease cache lifetime by, when required |
| Service rate | The average rate at which requests are being serviced |
| Arrival rate | The average rate at which requests are being received |
| Workload | The ratio of arrival rate to service rate |
| Maximum cache entries | (Optional) The maximum number of server responses in the cache, if limiting the total number of server responses is desirable |
| Maximum cache size | (Optional) The maximum total size of all the server responses in the cache, if limiting the memory used by the cache is desirable |
| Maximum cacheable response size | (Optional) The maximum size of a server response that can be cached, such that a response is permitted to be added to the cache if its size is less than the maximum cacheable response size, if limiting the responses to be cached to only those that are of a reasonable size is desirable |

Furthermore, in an exemplary embodiment of the invention, there are four cache entry parameters, as defined in the following table.

| Parameter | Definition |
| --- | --- |
| Creation time | The time at which the server response was created |
| Directory filter | The desired specific values and/or ranges for one or more attributes of the entries in the dynamic directory, to search for the desired entries in the directory |
| Server response | The information from the entries in the dynamic directory matching the directory filter |
| Cache entry size | (Optional) The memory taken by the server response, used to calculate the total memory used by the cache, and required only if maximum cache size is enforced |

Those of ordinary skill within the art will appreciate a comparison of precise and imprecise caches to distinguish the two types of caches, and further understand the nature of imprecise caches according to an exemplary embodiment of the invention. Precise caches have been specifically utilized in distributed database and transaction caching applications, as those of ordinary skill within the art understand. A first distinction between such precise caches and the imprecise caches of the invention is that, whereas a cache entry is invalidated in a precise cache when the entry is inconsistent with the database (i.e., the directory), the cache entry is invalidated in an imprecise cache only when the entry has expired. As has been described, a cache entry in the inventive imprecise cache may not completely accurately reflect the state of the directory; however, so long as it has not expired, the cache entry will not be invalidated.

Second, in a precise cache, whether a cache entry should be invalidated is determined when a change occurs in the database, such that the database notifies the cache that a cache entry may have to be invalidated. Conversely, according to an exemplary embodiment of the invention, in an imprecise cache whether a cache entry should be invalidated is determined when a miss occurs in the cache—that is, when no matches were found in the cache according to a particular request.

Third, it is determined that a cache entry should be removed from a precise cache when a cache entry is invalidated, or when no space is available for a new entry, in which case a replacement rule is invoked. Conversely, as has been described, it is determined that an entry should be removed from an imprecise cache also when a cache entry is invalidated, or when no space is available for a new entry (in which case a replacement rule is invoked), or also when cache (entry) lifetime has been changed.

Fourth, however, the specific cache entry to be removed from either a precise or an imprecise cache is the invalidated cache entry, or the entry selected by the replacement rule. Fifth, the replacement rule for precise and imprecise caches are also identical in accordance with one embodiment of the invention: the rule selecting the cache entry least recently used (LRU), or the entry having the lowest hit ratio, as has been described. Conversely, sixth, the lifetime for an entry in a precise cache is forever, until it is specifically invalidated (because it is inconsistent) or replaced, while the lifetime for an entry in an imprecise cache depends on the current workload of the server (i.e., the entry may become expired and thus invalidated), or also until it is specifically replaced.

Specific implementation details according to an exemplary embodiment of the invention have been described. The policies of such an imprecise cache, and the dynamics of cache (entry) lifetime in such an imprecise cache, have been described. The parameters for both an imprecise cache and an entry in such a case have been provided. Finally, a comparison between imprecise and precise caches has been given.

Exemplary Algorithm

In this section, an exemplary algorithm in conjunction with which embodiments of the invention may be implemented is provided. The following exemplary algorithm is given in pseudocode, but those of ordinary skill in the art will recognize that the pseudocode has a passing resemblance to the programming language C. The input to the algorithm is a directory download request Req, and the output of the algorithm is a directory response NewDirectoryResponse. Subroutines are delimited by curly brackets "{" and "}", and comments are delimited by double slashes "//".

```
{
    // Initialize the output variable in order to make sure we can
    // distinguish success from failure
    NewDirectoryResponse = NULL;
    // Try to find a cached directory download response in the
    // Cache List.
    // Start from the front of the list because the list is
    // ordered by time. The newest one is in the
    // front.
    For (each ResponseCache X in the CacheList L)
    {
        // We look for the one with equivalent filter.
        // Two different filters are equivalent if one can be
        // rewritten into the other without
        // changing the semantics of the former.
        // Looking for an equivalent can increase the
        // possibility of being a match.
        if (X.directoryFilter is equivalent to Req.directoryFilter)
        {
            // Make sure the matched cache is not expired.
            if (X is not expired)
            {
                // Duplicate the cached directory
                // download response.
                NewDirectoryResponse =
                    duplicate (X.directoryResponse);
            }
            else
            {
                // Exit the loop because the rest of response
                // caches are older than this one. If this one
                // is already expired, the rest of them must be
                // expired too. Remember that the Cache
                // List is sorted by timestamp. The output
                // variable NewDirectoryResponse is NULL.
                // As a result, we will construct the response
                // from scratch later. The expired caches
                // will be removed later when we add a new cache
                // to the Cache List.
            }
            // Exit the loop now.
            break;
        }
    }
    // The output variable NewDirectoryResponse can be NULL
    // when there is no match or
    // when there is an expired match.
    // In either case, we need to construct the cache from
    // scratch.
    If (NewDirectoryResponse = NULL)
    {
        // Remove expired caches in the Cache List
        // When we locate the first expired cache, we can then
        // remove all the caches
        // after that because they are older than that
        Remove all expired cache responses in CacheList L;
        // Construct a response from scratch
        Construct the directory response from scratch and
            put it in NewDirectoryResponse;
        // Create a new cache response to remember this cache.
        // Fill in the timestamp, and duplicate the filter and
        // response.
        Create a new cache response Y;
        Y.timestamp = current time;
        Y.directoryFilter = duplicate(Req.directoryFilter);
        Y.directoryResponse = duplicate(NewDirectoryResponse);
        // Add the new response cache in the front of
        // the Cache List.
        Add Y in the front of CacheList L;
    }
    // Return the directory download response.
    return NewDirectoryResponse;
}
```

Conclusion

The imprecise caching of directory download responses for dynamic directory services has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the invention is fully intended to cover databases as well as dynamic directories, such that the term directory may be interpreted to encompass any database amenable to the invention in such an embodiment of the invention. Therefore, it is manifestly intended that this invention be limited only by the following claims and equivalents thereof.

We claim:

1. A computerized system comprising:

a plurality of clients; and, a server maintaining a dynamic directory of the clients and an imprecise cache comprising server responses to directory download requests from the clients, wherein the imprecise cache enables the server to more quickly service the download requests from the clients.

2. The computerized system of claim 1, wherein each server response in the imprecise cache definitely accurately reflects the dynamic directory only when the server response was generated.

3. The computerized system of claim 1, wherein at least one directory download request from a client has a corresponding server response in the imprecise cache that inaccurately reflects the dynamic directory when the request was generated.

4. The computerized system of claim 1, wherein the imprecise cache further comprises a directory filter for each server response in the cache, the filter associated with a corresponding directory download request.

5. The computerized system of claim 1, wherein the imprecise cache further comprises a time stamp for each server response in the cache indicating when the server response was created.

6. The computerized system of claim 1, wherein each of the server responses is younger than a predetermined length of time.

7. A computerized server comprising:

a processor;

a computer-readable medium storing data representing a dynamic directory of clients and an imprecise cache comprising expirable server responses to directory download requests from the clients;

a communications device to communicatively couple with the clients; and, instructions executed from the medium by the processor to cause the server to receive from a client through the communications device a directory download request; and, send to the client through the communications device a server response from the imprecise cache that corresponds to the request, wherein the server response may inaccurately reflect the dynamic directory when the server received the request.

8. The computerized server of claim 7, wherein the instructions further cause the server to receive from a second client through the communications device a second directory download request;

generating an expirable server response in the imprecise cache corresponding to the second directory download request; and, sending to the second client through the communications device the server response corresponding to the second directory download request, wherein the server response corresponding to the second directory download request definitely accurately reflects the dynamic directory only when the server generated the response.

9. The computerized server of claim 7, wherein the instructions further cause the server to periodically remove expired entries from the imprecise cache.

10. A computerized method comprising:

generating a directory download request at a client;

sending the request from the client to a server;

matching the request at the server to a server response in an imprecise cache of expirable server responses to directory download requests, the cache maintained at the server;

determining at the server, upon successfully matching the request to a particular server response in the imprecise cache, whether the particular server response has expired; and, sending the particular server response from the server to the client upon determining that the particular service response has not expired.

11. The computerized method of claim 10, further comprising:

removing at the server all expired server responses from the imprecise cache upon determining that the particular server response has expired;

generating at the server a new expirable server response corresponding to the directory download request generated at the client;

adding at the server the new expirable server response to the imprecise cache; and, sending the new expirable server response from the server to the client.

12. The computerized method of claim 10, further comprising:

removing at the server all expired server responses from the imprecise cache upon unsuccessfully matching the request to a particular server response in the imprecise cache;

generating at the server a new expirable server response corresponding to the directory download request generated at the client;

adding at the server the new expirable server response to the imprecise cache; and, sending the new expirable server response from the server to the client.

13. A computer-readable medium having computer-executable instructions to cause a server computer to perform a method comprising:

receiving a directory download request from a client;

matching the request to a non-expired server response in an imprecise cache of expirable server responses to directory download requests, the cache maintained by the server;

sending a particular non-expired server response in the cache to the client, upon successfully matching the request to the particular non-expired server response;

upon unsuccessfully matching the request to a non-expired server response in the imprecise cache, perform tasks including:

removing all expired server responses from the imprecise cache;

generating a new expirable server response corresponding to the directory download request;

adding the new expirable server response to the imprecise cache; and, sending the new expirable server response to the client.

14. A computer-readable medium having stored thereon a data structure for an imprecise cache comprising a plurality of records, each record comprising:

a first data field including data representing a directory filter corresponding to a particular directory download request;

a second data field including data representing a directory response to the particular directory download request;

a third data field including data representing a time stamp; and, a fourth data field including data representing a pointer to another record in the cache.

15. The computer-readable medium of claim 14, wherein the directory filter of each record comprises a value for at least one attribute of the entries in a dynamic directory to which the particular directory download request pertains.

16. The computer-readable medium of claim 14, wherein the directory response of each record comprises information from entries in a dynamic directory matching the directory filter of the record.

17. The computer-readable medium of claim 14, wherein the time stamp of each record corresponds to when a server created the record.

18. The computer-readable medium of claim 14, wherein the pointer of each record other than the first record points to an older record in the cache.

* * * * *